United States Patent [19]

Feigel

[11] Patent Number: 5,611,413
[45] Date of Patent: Mar. 18, 1997

[54] CONTROLLABLE VALVE ARRANGEMENT FOR CONTROLLABLE TWO-TUBE VIBRATION ABSORBERS

[75] Inventor: Hans-Joerg Feigel, Rosbach, Germany

[73] Assignee: ITT Automotive Europe GmbH, Germany

[21] Appl. No.: 196,114

[22] PCT Filed: Sep. 2, 1992

[86] PCT No.: PCT/EP92/02022

§ 371 Date: Oct. 5, 1994

§ 102(e) Date: Oct. 5, 1994

[87] PCT Pub. No.: WO93/05315

PCT Pub. Date: Mar. 18, 1993

[30] Foreign Application Priority Data

Sep. 6, 1991 [DE] Germany .......................... 41 29 581.1

[51] Int. Cl.⁶ ................................ B60G 17/08; F16F 9/50
[52] U.S. Cl. ...................... 188/299; 188/322.13
[58] Field of Search ............................. 188/299, 322.13, 188/322.14, 318, 319, 313, 315

[56] References Cited

U.S. PATENT DOCUMENTS 5,386,893  2/1995  Feigel ...................................... 188/299
5,400,877  3/1995  Kircher et al. .......................... 188/299

FOREIGN PATENT DOCUMENTS

| 0433701 | 11/1990 | European Pat. Off. . |
|---|---|---|
| 0399326 | 6/1991 | European Pat. Off. . |
| 853236 | 10/1952 | Germany . |
| 4108026 | 9/1992 | Germany . |
| 751164 | 6/1956 | United Kingdom . |
| WO8909891 | 10/1989 | WIPO . |

*Primary Examiner*—Josie Ballato
*Attorney, Agent, or Firm*—Rader, Fishman & Grauer PLLC

[57] ABSTRACT

A controllable valve arrangement for controlling two-tube vibration absorbers comprises a power cylinder with an interior space subdivided into a first and a second power chambers by virtue of a slidable piston, and with a balancing chamber partly filled with oil. A valve body is actuated by an electromagnetical transducer and prestressed by a spring. The valve body influences a hydraulic connection through which a unidirectional flow is passed. In a traction stage, a unidirectional flow exists between the first power chamber, on one hand, and the second power chamber jointly with the balancing chamber, on the other hand. In a thrust stage, a unidirectional flow exists between the first power chamber jointly with the second power chamber, on one hand, and the balancing chamber, on the other hand.

31 Claims, 6 Drawing Sheets

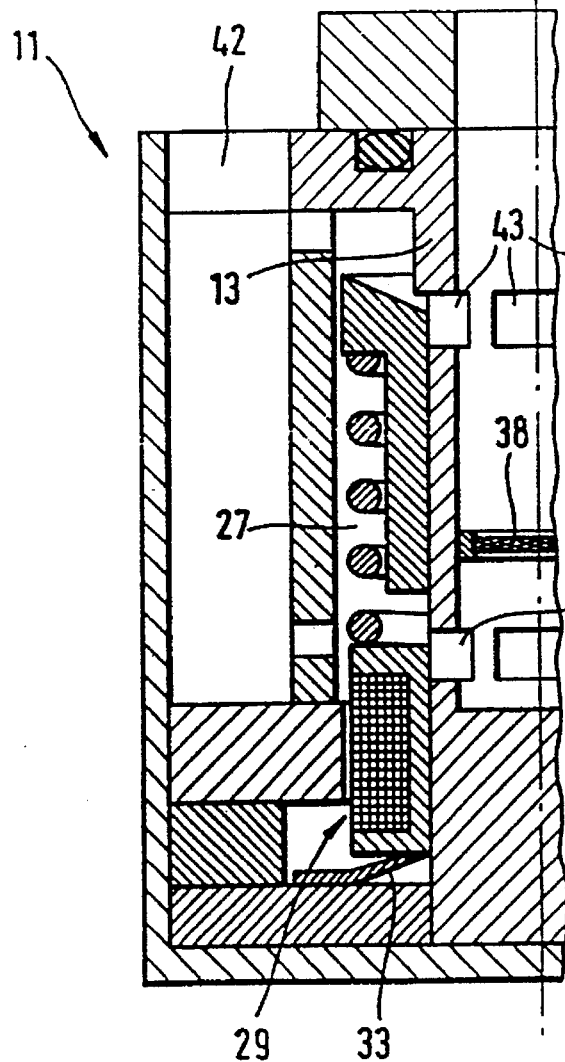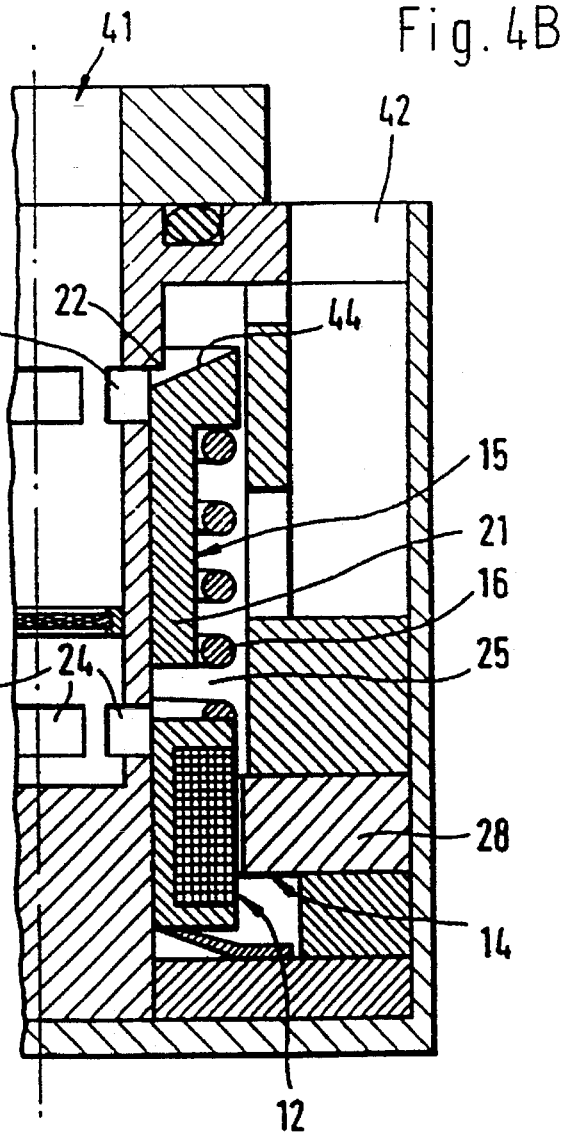

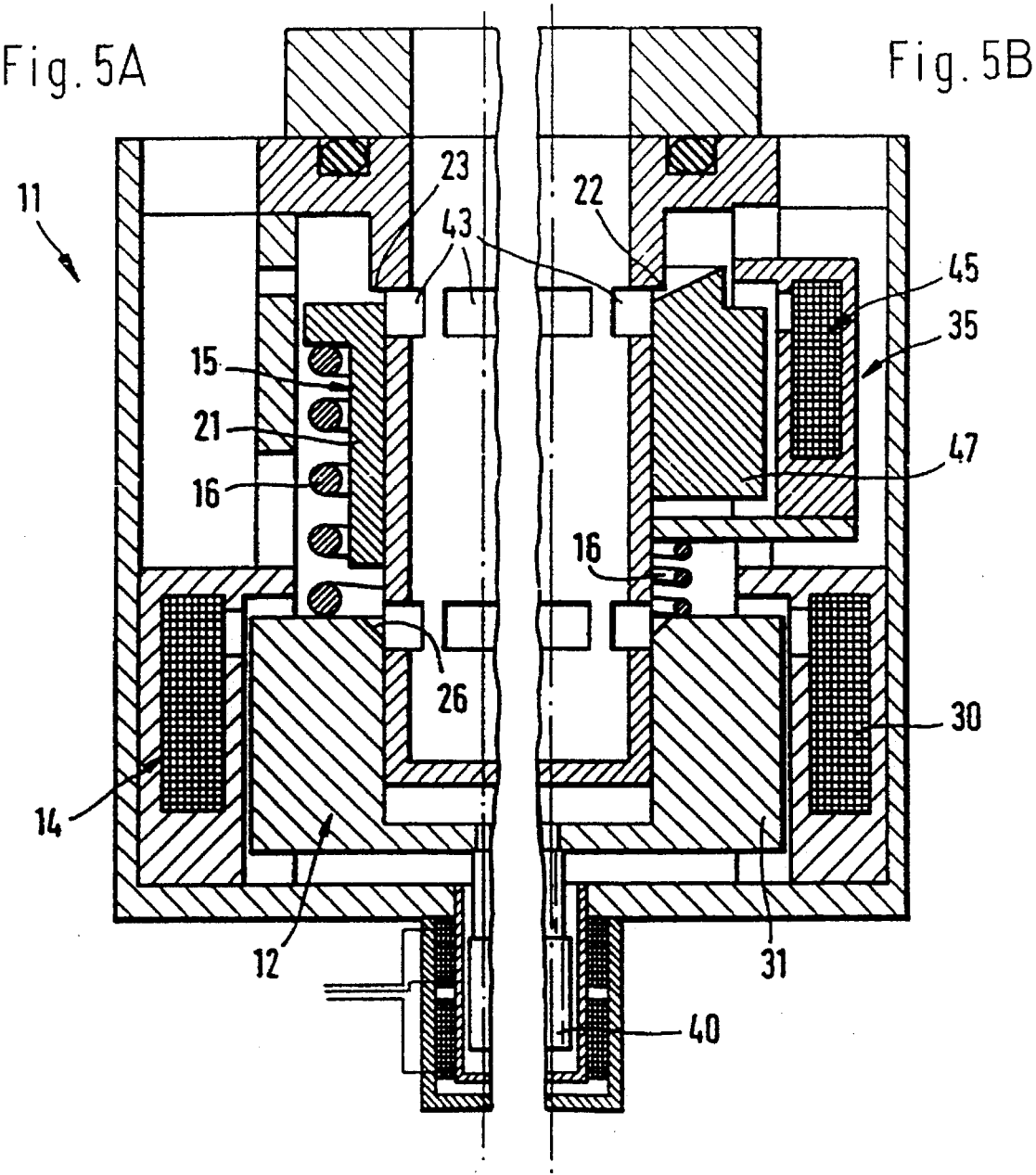

CONTROLLABLE VALVE ARRANGEMENT FOR CONTROLLABLE TWO-TUBE VIBRATION ABSORBERS

FIELD AND BACKGROUND OF THE INVENTION

The present invention is generally related to a valve arrangement for a controllable two-tube vibration absorber, and more particularly, to a valve arrangement for a controllable two-tube vibration absorber with a power cylinder whose interior space is subdivided into a first and a second power chambers by means of a slidable piston, and with a balancing chamber partly filled with oil. The inventive valve arrangement includes a valve body which is actuatable by an electromechanical transducer and prestressed by means of a spring. The aforementioned valve body influences a hydraulic connection through which a unidirectional flow is passed. In the traction stage, the unidirectional flow exists between said first power chamber, on one hand, and second power chamber jointly with said balancing chamber, on the other hand. In the thrust stage the unidirectional flow exists between said first power chamber jointly with said second power chamber, on one hand, and said balancing chamber, on the other hand.

A valve arrangement generally related to the present invention is known from the older, not anticipated patent application of this applicant, No. P 41 08 026.2. The valve arrangement of the vibration absorber shown there is configured as a single-stage slide valve. The position of the valve slide depends on the hydraulic pressure differential coming about across the slide valve, the volumetric flow rate passing through the valve, and the actuating current of the electromechanical transducer.

The prior-art valve arrangement has the disadvantage that the valve body is furnished with a ring-shaped surface which is subjectable to the hydraulic pressure existing in the first power chamber and is, therefore, not pressure-balanced. Therefore, that valve can only perform a pressure-limiting function that has a negative bearing on the functioning of the vibration absorber. The drawback is particularly acute in the range of low volumetric flow rates in which a strong transmission of vibrations takes place from the wheels to the body of an automotive vehicle which is equipped with such state-of-the-art vibration absorbers.

Therefore, one object of the present invention is to provide a valve arrangement including a valve body that is actuatable by an electromechanical transducer that improves the functioning of the vibration absorber. The present invention improves the behavior of the vibration absorber and the related desired cushioning comfort, especially in the range of low volumetric flow rates.

SUMMARY OF THE INVENTION

According to the present invention the object of improving vibration absorber performance is attained in part because the valve body is designed to be pressure-balanced. Also, in a first range of volumetric flow rate the valve body performs a restricting function that depends on the actuation of the electromechanical transducer. The valve body simultaneously interacts with a second, pressure-unbalanced valve body which in a second range of volumetric flow rate influences a second hydraulic connection through which a unidirectional flow is passed. In the traction stage, this second hydraulic connection exists between said first power chamber, on one hand, and said second power chamber jointly with said balancing chamber, on the other hand. In the thrust stage, this second hydraulic connection exists between said second power chamber jointly with said first power chamber, on one hand, and said balancing chamber, on the other hand. The second valve body performs a pressure-limiting function which also depends on the actuation of the electromechanical transducer during the thrust stage.

The present invention provides the following advantages.

In the range of low vibration absorber speeds and low vibration absorbing forces, which are decisive for desirable cushioning comfort, a vibration absorber equipped with the inventive valve arrangement is more finely dosable.

If the electromechanical transducer actuation fails, the vibration absorber will remain operative as a passive absorber. By appropriate design measures a valve arrangement in accordance with the present invention can have one of the potential characteristic curves preadjusted as the passive characteristic curve of the absorber in the event of the electromechanical actuation missing or failing.

In contrast with a force-controlled arrangement, the inventive valve arrangement, controlled on the basis of characteristic curves, can tolerate a malfunctioning the electromechanical actuation. For example, signalling times or digitalization errors do not hinder the effectiveness of the inventive arrangement.

By an expedient shaping of the individual characteristic curves a change of the position of the vibration absorber valve will be necessary exclusively in case of a variation of the initiating condition, undulation of the driveway or driving situation. Contrary to this, a force-depending actuation of the vibration absorber must react to any variation of the absorber speed.

A further advantage of the present invention is that the second valve body is actuatable by a second electromechanical transducer. In this conjunction it will be particularly expedient if and when said second valve body is configured as a part of the second electromechanical transducer, for example as the armature of an electromagnet or as a coil support of a plunger coil which interacts with a permanent magnet. Optional characteristic curves can be realized with an arrangement of this kind, since the restricting and the pressure-limiting functions will allow to be adjusted independently of each other. For this reason, the inventive valve arrangement is extremely well suited for test purposes.

In another embodiment according to the present invention, an advantageous linkage of the restricting function and the pressure-limiting function only is attained when making use of only one electromechanical transducer because the second valve body is influenced indirectly through the excursion of the first valve body by the actuation of the electromechanical transducer.

A compact-type design according to one embodiment of the inventive valve arrangement includes the first valve body configured in the shape of a bushing being slidingly guided on a stationary cylindrical guide element. In the latter embodiment, the bushing interacts with cross-sectional areas of flow which are configured in the guide element and are preferably designed in the shape of slots, particularly as annular grooves. In this conjunction, the second hydraulic connection is formed by a first bore which is configured in the guide element, by a cylindrical chamber which accommodates the second valve body and the spring, and by a second bore which is configured in the bushing coaxially with the first bore.

In another embodiment of the present invention, the second valve body is configured in the shape of a ball. The second valve body is prostressed by a spring and interacts with a sealing seat being at one end of the first bore. An inventive valve arrangement featuring such a configuration is distinguished by a simple design that provides a simply dimensioned "sensing area" at the second valve body.

In accordance with a preferred embodiment of the present invention, the second hydraulic connection is formed by cross-sectional areas of flow, for example by slots, bores or annular grooves in the guide element, the second valve body designed as a second bushing slidingly guided on the guide element interacting with a sealing seat configured on the guide element. The sealing seat is preferably a step which has a smaller or larger diameter. A better splitting-up of the volumetric flow rates will be rendered possible by this provision. In addition, manufacture of the arrangement is simplified and favorable prerequisites are created for a compensation of the force of flow.

In this context, it will be particularly advantageous for the smooth functioning of the inventive valve arrangement of a corresponding vibration absorber if, during the interaction of the first valve body with the cross-sectional areas of flow, a compensation of the hydraulic forces turning up in the effective range takes place. This measure affords the additional advantage of reducing the energy requirements of the electromechanical transducer.

The compensation of the forces of flow mentioned before is, for example, attained in that the bushing and/or the chamber which is disposed behind the cross-sectional areas of flow as seen in the flow direction are configured to safeguard a deviation of the volumetric flow. In this context, the front surface of the valve body, designed in the shape of a bushing, which interacts with the cross-sectional areas of flow preferably has a truncated cone-shape.

According to another embodiment of the present invention, the forces of flow are counteracted because the cross-sectional areas of flow end up in an annular hydraulic chamber which is connected to the outlet of the valve arrangement. In this embodiment, the resulting static pressure within the annular chamber effectively induces a hydraulic force component which counteracts the Bernoulli's forces acting on the bushing.

An inexpensive, space-saving embodiment of the inventive valve arrangement is achieved wherein the first valve body is conceived as being a part of the electromechanical transducer. In this embodiment, the electromechanical transducer may either be configured as a plunger coil interacting with a permanent magnet whose coil support is formed by the first valve body or as an electromagnet whose armature is formed by the first valve body. The former construction features a more favorable dynamic behavior, whereas the electromagnet used in the latter provides a sturdy assembly which is not susceptible to trouble.

Further embodiments of the present invention include means to guarantee the functioning of the vibration absorber, equipped with the inventive valve arrangement, even in case of a failure of the electromechanical transducer; means for performing a so-called fail-safe function. The fail-safe means safeguard a predeterminable mean restricting function and a predeterminable mean pressure-limiting function in the event of a failure of the electromechanical transducer. In one embodiment, the first valve body is, for example, prestressed by a second spring which counteracts the spring prestressing the second valve body. In this context, it must be safeguarded that the second hydraulic connection remains closed in the event of a current failure. Another embodiment includes means to perform the former function mentioned above which includes a third hydraulic connection provided between the inlet and the outlet of the valve arrangement which is simultaneously released by the first valve body when the hydraulic connection is closed by the force of the second spring. The use of a simple unidirectionally acting transducer is rendered possible by this provision.

If, however, the latter-mentioned function is performed, then the functioning reliability of the inventive valve arrangement will be increased since mean forces will occur even at elevated vibration absorber speeds. To realize this effect, the hydraulic connection is partly closed by a third spring which counteracts said spring which acts on the first valve body, in which case the electromechanical transducer will be effective bidirectionally.

In a further advantageous embodiment another possible means to perform a fail-safe function of the kind mentioned above consists in that a fourth spring is supported at a force-transmitting element which is actuatable by a third electromechanical transducer. The force-transmitting element affords a transmission of the force of the fourth spring to the first valve body in the event of a switch-off or a failure of the third electromechanical transducer. This measure constitutes a fail-safe process for unidirectionally acting transducers.

In order to achieve a sufficient, more uniform spreading of the characteristic curves for small volumetric flow rates, means are provided in further embodiments that ensure a nonlinear dependence of the cross-sectional area of opening of the cross-sectional areas of flow on the excursion of the first valve body. In this instance, the first valve body may, for example, be furnished with notches on its front surface or with bores in its range interacting with the cross-sectional areas of flow. As an alternative, the cross-sectional areas of flow which are provided in the guide element may also be configured in the shape of bores.

In order to avoid soiling or impurities causing clamping of the valve bodies, one advantageous further development of the subject matter of the present invention is that the hydraulic connections are preceded by filter elements. For example, one filter element is positioned in the guide element before the cross-sectional areas of flow.

Within another advantageous embodiment of the present invention, the first valve body is a part of a travel sensor device interacting with a controller or is coupled to such a device. The controller will generate a correcting variable by comparing the actual position of the first valve body to a preselected set position. The corresponding variable brings about a force of the electromechanical transducer that may exceed the stationary force required for maintaining the first valve body in the set position. The dynamics of the inventive valve arrangement will, therefore, be greatly increased.

In order to further reduce the power requirements of the electromechanical transducer, the first valve body can be pilot-controlled. This provision simultaneously reduces the susceptibility of the valve arrangement to soiling.

Further details, features and advantages of the present invention will be revealed by the following description of a total of seven embodiments, making reference to the accompanying drawings.

BRIEF DESCRIPTION OF THE DRAWINGS

FIGS. 3, 4A, 4B, 5A, 5B, 6 and 7 respectively show a first to seventh design version of the inventive valve arrangement in the sectional representation corresponding to that in FIG. 1, in an upscaled illustration.

DETAILED DESCRIPTION OF THE PREFERRED EMBODIMENTS

Figure 1:
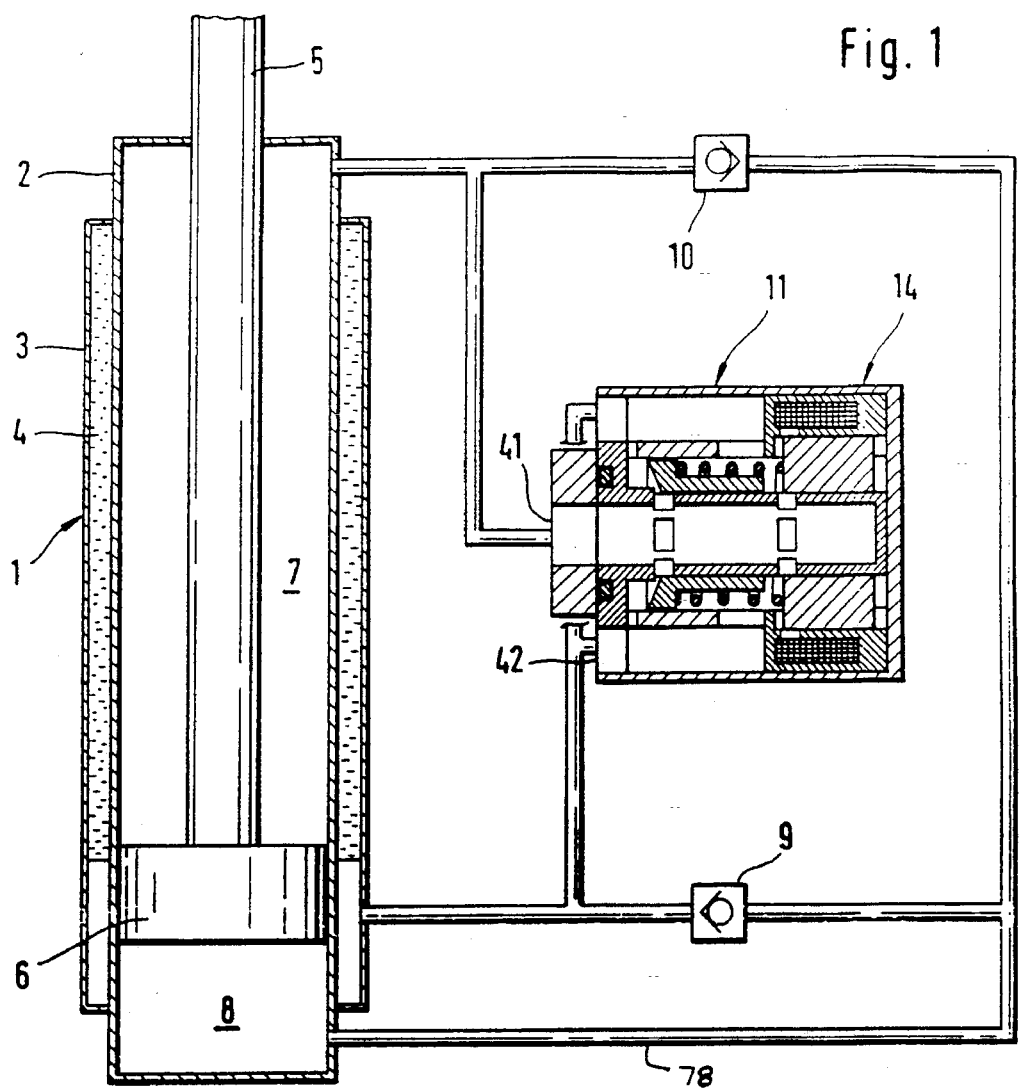
FIG. 1 shows a controllable two-tube vibration absorber equipped with the inventive valve arrangement in a diagrammatic sectional representation.

The two-tube vibration absorber 1 which is represented diagrammatically in FIG. 1 is comprised of a power cylinder 2 and an external tube 3 positioned coaxially with power cylinder 2, so that a storage tank or balancing chamber 4 which has a circular ring-shaped cross section, partly filled with oil, is formed between them. The interior space of power cylinder 2 is subdivided by a piston 6 being slidable by a piston rod 5 into a first power chamber 7 being configured above the piston 6 and a second power chamber 8 being configured beneath the piston.

First power chamber 7 is connected to an inlet 41 of a valve arrangement 11 whose outlet 42 is in connection, on one side, with the balancing chamber 4 and, on the other side, through a first non-return valve 9 with the second power chamber 8. Furthermore, a hydraulic connection 78 is provided which connects the second power chamber 8 through a second non-return valve 10 to the first power chamber 7. In the event of movement of the piston 6, a flow will occur in one direction only through the valve arrangement 11 which serves for the variation of the cross-sectional area of passage between the first power chamber 7, the second power chamber 8, and the balancing chamber 4, respectively, during the traction stage. Similarly a unidirectional flow will occur to effectively vary the cross-sectional area of flow between the second power chamber 8 and the balancing chamber 4 during the thrust stage.

Figure 2:
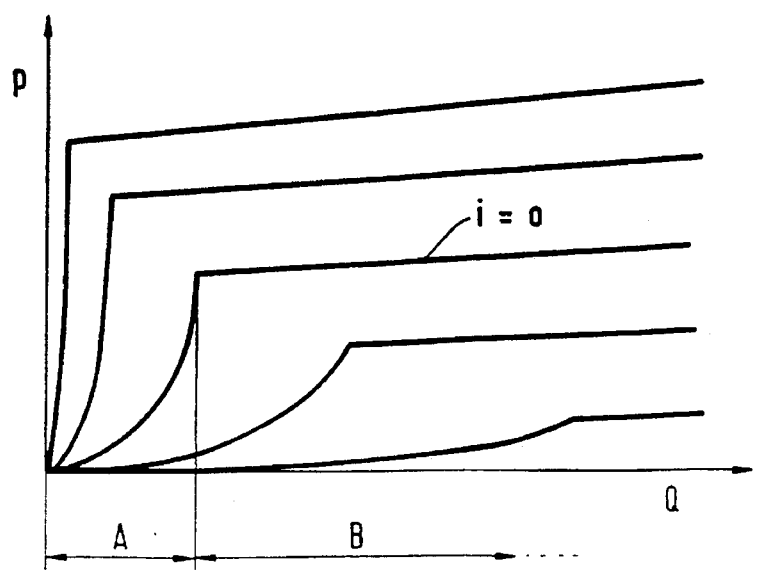
FIG. 2 shows characteristic curves that can be realized with the inventive valve arrangement.

FIG. 2 shows a diagrammatic representation of the characteristic curves of the vibration absorber shown in FIG. 1; the dependence of the hydraulic pressure existing within the vibration absorber on the volumetric flow passing through the valve arrangement 11 in the presence of different ratings of the energizing current which actuates an electromechanical transducer 14 of the controllable valve arrangement 11.

Figure 3:
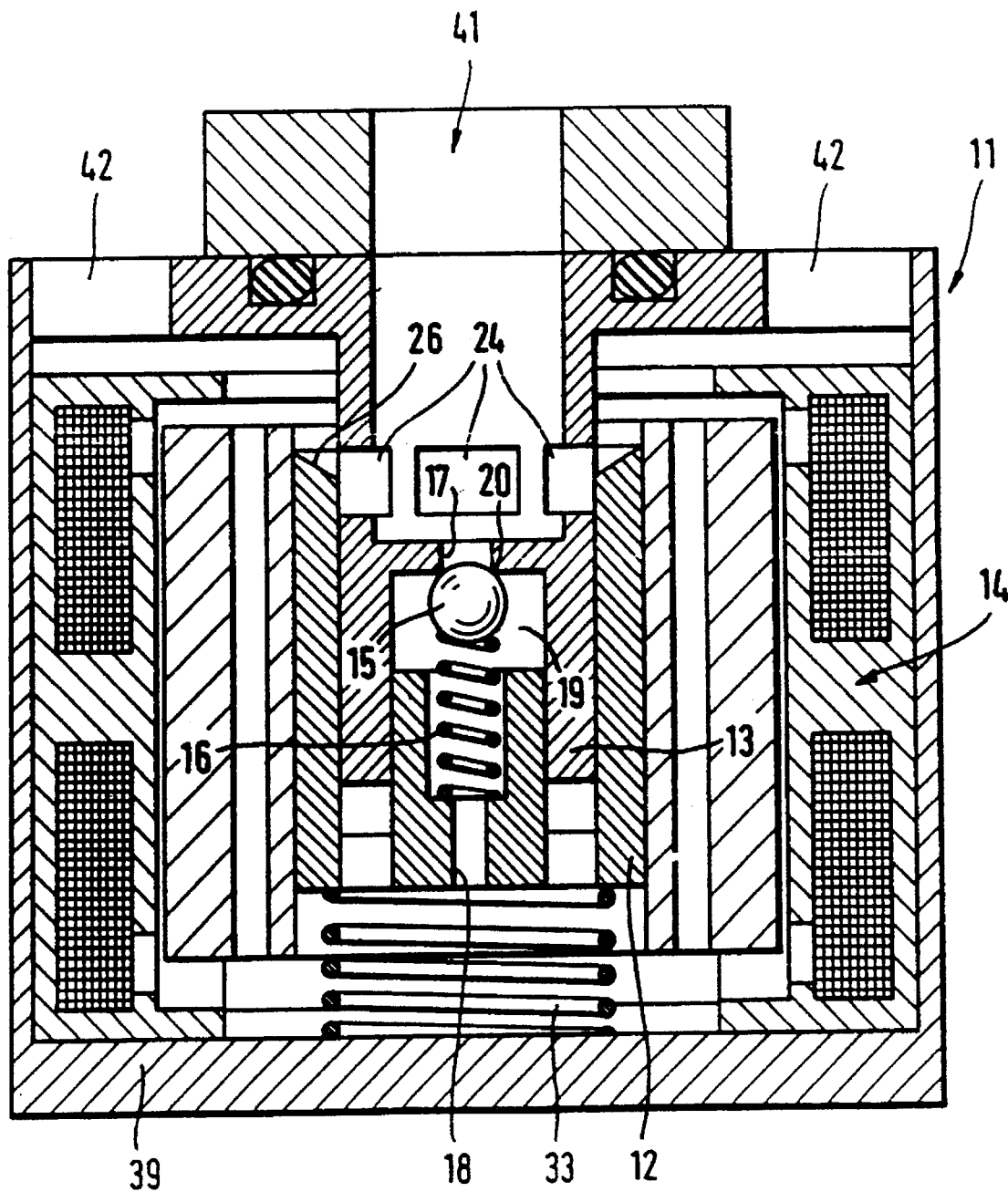

A first embodiment of the inventive valve arrangement 11 which is shown in FIG. 3 comprises a valve housing 39 which accommodates a cylindrical guide element 13 presenting cross-sectional areas of flow 24. Within guide element 13 a first valve body 12 is slidingly guided and is positioned to be adjustable by means of electromechanical transducer 14. First valve body 12 is configured in the shape of a tubular bushing which interacts with the cross-sectional areas of flow 24. First valve body 12 defines, within the interior space of guide element 13, a cylindrical chamber 19 into which a bore 17, in guide element 13 beneath the cross-sectional areas of flow 24, and a bore 18, in valve body 12, end up. Sealing seat 20 is at the rear end of the bore 17. A second valve body 15 interacts with sealing seat 20. Second valve body 15 is prestressed by a spring 16 taking support at the first valve body 12. Second valve body 15 is a ball in the illustrated example. In this instance, the electromechanical transducer 14, for adjusting the position of first valve body 12, is an electromagnet whose armature straddles the first valve body 12. Beyond this, a compression spring 33 counteracting the spring 18 is clamped in between the first valve body 12 and the bottom of the valve house 39 whose function will be explained in more detail below.

For the following description of the functioning of the inventive valve arrangement 11 it is initially assumed that the windings of the electromagnetic transducer 14 are not energized (middle characteristic curve in FIG. 2) and that the cross-sectional areas of flow 24 which are formed by slots or annular grooves are not covered by the first valve body 12, thereby providing a hydraulic connection between the inlet 41 and the outlet 42 of the valve arrangement. The small volumetric flow (volumetric flow range A in FIG. 2) which is initiated by a slight uniform movement of the piston 6 leads to an increase of the pressure which is determined by the opening of the cross-sectional area of flow 24 and which acts on the part-surface of second valve body 15 that faces inlet 41. Sealing seat 20, in the guide element 13, will be maintained closed by the force of the spring 16 and, when the windings of the electromagnetic transducer 14 are energized, by the actuating force exerted by the transducer 14. Sealing seat 20, therefore, remains closed until, for example, the resulting pressure from an increase in the volumetric flow (volumetric flow range B in FIG. 2) overcomes the closing force which acts on the second valve body 15. The opening of the sealing seat 20 brings about a movement of the bushing-shaped first valve body 12 and, consequently, a wider opening of the slots 24. Therefore, the volumetric flow passing through the slots 24 increases and the pressure ruling at the inlet 41 of the valve arrangement 11 subsequently decreases. The described procedure will continue until a condition of equilibrium of forces will exist again at the valve bodies 12, 15.

It will be advantageous when the portion of first valve body 12 that interacts with the cross-sectional areas of flow (slots) 24 has the shape of a truncated cone. The portion of first valve body 12 having a truncated cone shape is referred to as front surface 26. In this way the volumetric flow will be deviated during its passage through the slots 24 which results in an impulse effect being suited to compensate for the Bernoulli's forces that are caused by the flow and which act in the closing direction of the cross-sectional areas of flow. When the force generated by the electromechanical transducer 14, which preferably acts bidirectionally, changes, the position of the pressure-balanced first valve body 12 changes. Simultaneously, the closing force of the second valve body 15 which is exerted by the spring 16 varies.

In the de-energized condition of the transducer 14, the cross-sectional areas of flow 24 are kept partly closed by the action of the compression spring 33 taking support at the first valve body 12, so that in the event of a failure of the electromechanical transducer a predeterminable mean restricting function as well as predetermtnable mean pressure-limiting function are maintained.

Another embodiment of the inventive valve arrangement 11 is shown in FIG. 4A. Electromechanical transducer 14 is configured in the shape of a plunger coil 29 interacting with a permanent magnet 28 with the first valve body 12 serving simultaneously as a coil support of the prementioned plunger coil 29. The second valve body 15 is formed by a tubular bushing 21 which is slidingly guided on the guide element 13. Second valve body 15 interacts with the cross-sectional areas of flow, slots 43, being provided in said guide element 13, and with a sealing seat 22 defined by guide element 13. For flow technique reasons it will be advantageous in this context when the front surface 44 of the bushing 21 has a truncated cone shape. Filter elements 38 are provided in order to protect the functionally important ranges of the cross-sectional areas of flow 24, 43 from soiling. FIG. 4A shows one filter element 38 arranged upstream of the cross-sectional areas of flow 24.

The chamber 25 which is configured downstream of the cross-sectional areas of flow 24 as seen in the direction of flow is preferably shaped to guarantee a deviation of the volumetric flow in order to compensate the hydraulic forces coming about during the interaction of the first valve body 12 with the cross-sectional areas of flow 24. A solution of this kind is illustrated in FIG. 4B. In the design version which is shown in FIG. 4B the cross-sectional areas of flow 24 end up in an annular chamber 27. Annual chamber 27 is connected to the outlet 42 of the valve arrangement 11 such that the static pressure coming about within annular chamber 27 will cause a hydraulic force component which counteracts the Bernoulli's forces acting on the first valve body 12.

In the embodiment shown in FIG. 5A the electromechanical transducer 14 is configured as an electromagnet 30 whose armature 31 forms the first valve body 12. The second valve body 15, or bushing 21, is guided on the guide element 13 such that bushing 21 interacts with a radial step 23. Radial step 23 has a larger diameter relative to the outer radius of guide element 13 and the inner radius of bushing 21. Radial step 23 is positioned in the range of the cross-sectional areas of flow 43 and forms the sealing seat 22, as illustrated in the lefthand half of FIG. 5. As an alternative, an arrangement shown in FIG. 5B will be feasible. In the embodiment illustrated FIG. 5B, the second valve body 15 is configured as an armature 47 of a second electromechanical transducer 35 which preferably is an electromagnet 45. In this embodiment the spring 16 prestressing the first valve body 12, or armature 31, takes support at a support not identified more closely of the second electromechanical transducer 35. The first valve body 12 may be part of a travel sensor device 40 interacting with a controller (not shown) or may be coupled to such a device.

Figure 6:
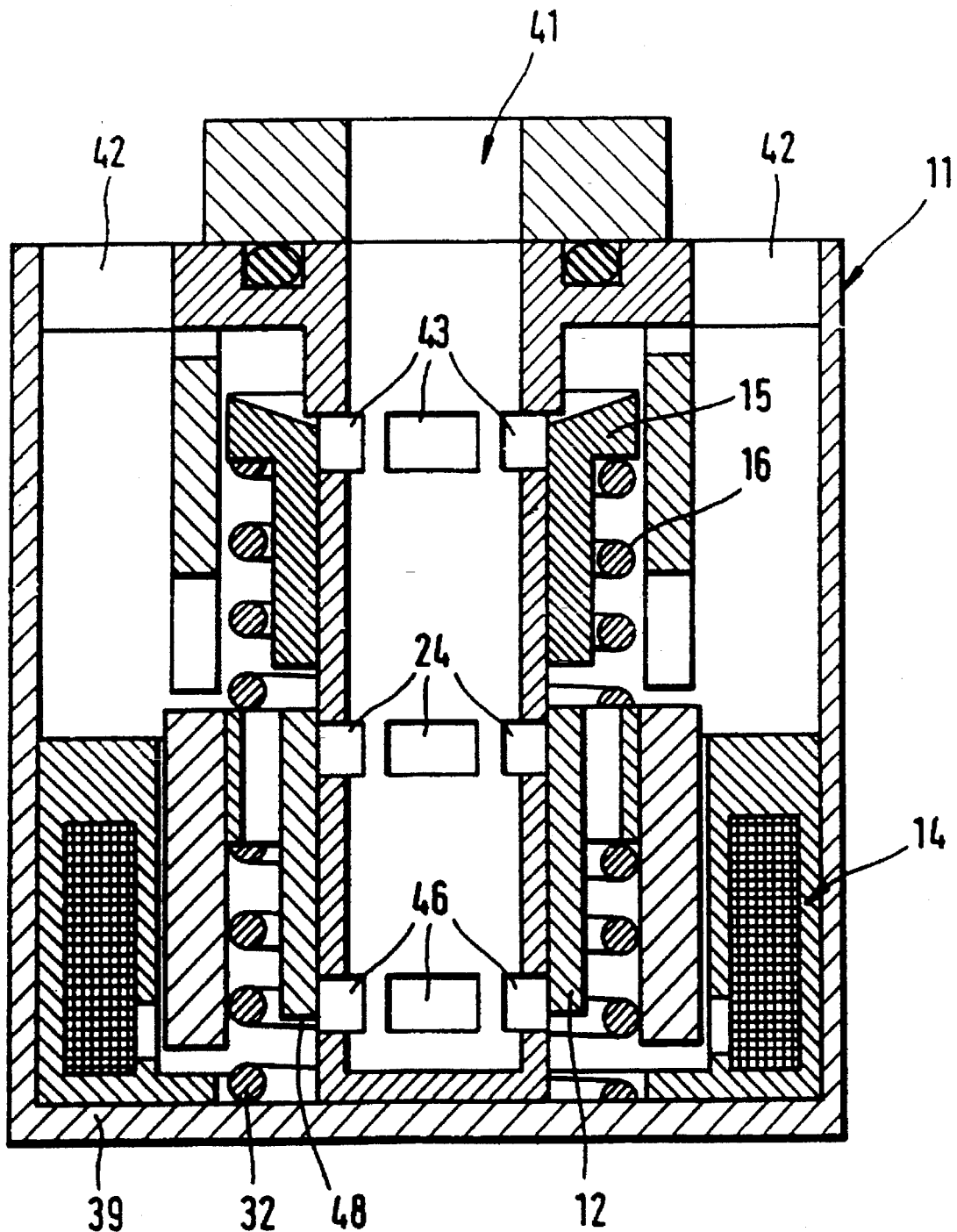

In still another embodiment of the inventive valve arrangement 11 shown in FIG. 6, a second spring 32 is provided between the first valve body 12 and the bottom of the valve house 39. Second spring 32 counteracts spring 16 which is positioned between the two valve bodies 12 and 15 and whose force and spring constant is preselected such that the cross-sectional areas of flow 24 are covered by the first valve body 12. In its lower range, guide element 13 is simultaneously furnished with further cross-sectional areas of flow 46 which interact with a control edge 48 defined on first valve body 12. Cross-sectional areas of flow 46 afford a third connection between the inlet 41 and the outlet 42. The third connection is opened in the event of a failure of the electromechanical transducer 14 to safeguard a predeterminable mean restricting function.

Figure 7:
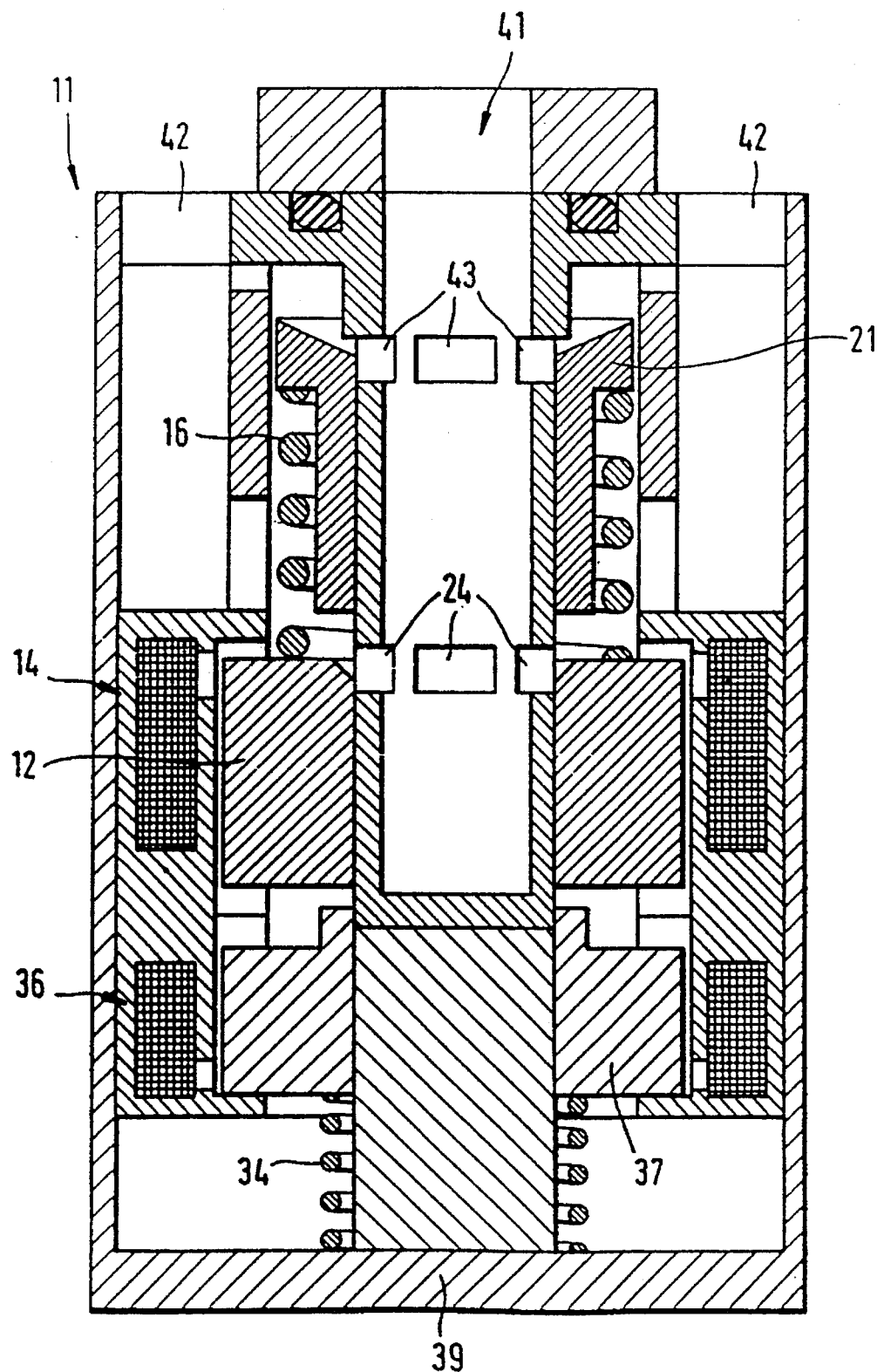

FIG. 7 shows another embodiment for safeguarding a predeterminable mean restricting function and a predeterminable mean pressure-limiting function in the event of a failure of the electromechanical transducer 14. This embodiment includes a fourth spring 34 which takes support at the bottom of the valve housing 39. Fourth spring 34 prestresses a force-transmitting element 37. Element 37 is actuatable, for example, by a third electromechanical or electromagnetic transducer 36. When the third transducer 36, which is preferably electrically coupled to the first transducer 14, is actuated force-transmitting element 37 will be kept at a distance from the first valve body 12. Force-transmitting element 37 is released in the event of a current failure so the force exerted by the spring 34 is transmitted to the first valve body 12. The interaction of the two springs 16 and 34 maintain valve body 12 in a defined middle position which results in the aforementioned desired effect.

Within the framework of the inventive thought it would, moreover, appear reasonable to envisage means ensuring a nonlinear dependence of the cross-sectional area of opening defined by the cross-sectional areas of flow 24 on the excursion of the first valve body 12. For example, valve body 12 may include notches on its front surface or be furnished with bores in the longitudinal range along valve body 12 interacting with the cross-sectional areas of flow 24. Another possibility consists in configuring the cross-sectional areas of flow 24 in the guide element 13 in the shape of bores. Further embodiments can, of course, be imagined in which the first valve body 12 is actuatable by a pilot stage.

It will be apparent to one skilled in the art that the preceding description is exemplary rather than limiting in nature. Modifications are possible without departing from the purview and spirit of the present invention, the scope of which is limited only by the appended claims.

What is claimed is:

1. A controllable valve arrangement in a controllable two-tube vibration absorber having a power cylinder whose interior space is subdivided into a first power chamber and a second power chamber by means of a slidable piston, and having a balancing chamber partly filled with oil, said valve arrangement, comprising: a first valve body which is actuatable by an electromechanical transducer, said valve body being prestressed by means of a first spring, said first valve body influencing a hydraulic connection through which a unidirectional flow is passed which exists between said first power chamber, on one hand, and said second power chamber jointly with said balancing chamber, on the other hand in a traction stage, the unidirectional flow existing between said first power chamber jointly with said second power chamber on one hand, and said balancing chamber, on the other hand in a thrust stage, said first valve body being pressure-balanced such that a first range of volumetric flow rate in said first valve body performs a restricting function which depends on the actuation of said electromechanical transducer; and a second valve body that is pressure-unbalanced such that in a second range of volumetric flow rate said second valve body influences a second hydraulic connection through which a unidirectional flow is passed which exists between said first power chamber, on one hand, and said second power chamber jointly with said balancing chamber, on the other hand, in the traction stage, the unidirectional flow existing between said second power chamber jointly with said first power chamber, on one hand, and said balancing chamber, on the other hand in the thrust stage, said second valve body performing a pressure-limiting function that depends on the actuation of said electromechanical transducer.

2. A valve arrangement as recited in claim 1, wherein said first valve body is designed as a part of said electromechanical transducer.

3. A valve arrangement as recited in claim 2, wherein said electromechanical transducer is configured as a plunger coil which interacts with a permanent magnet and whose coil support is formed by said first valve body.

4. A valve arrangement as recited in claim 2, wherein said electromechanical transducer comprises an electromagnet whose armature is formed by said first valve body.

5. A valve arrangement as recited in claim 1, further comprising a second electromechanical transducer that actuates said second valve body.

6. A valve arrangement as recited in claim 5, wherein said second valve body is designed as a part of said second electromechanical transducer.

7. A valve arrangement as recited in claim 1, wherein said second valve body is influenced indirectly through the excursion of said first valve body by the actuation of said electromechanical transducer.

8. A valve arrangement as recited in claim 7, further comprising means for guaranteeing a predetermined mean restricting function in the event of a failure of said electromechanical transducer.

9. A valve arrangement as recited in claim 8, further comprising a second spring that counteracts said first spring and prestresses said first valve body.

10. A valve arrangement as recited in claim 7, further comprising means for safeguarding a predetermined mean restricting function and a predetermined mean pressure-limiting function in the event of a failure of said electromechanical transducer.

11. A valve arrangement as recited in claim 10, further comprising a third spring acting on said first valve body in contrast with said first spring.

12. A valve arrangement as recited in claim 11, further comprising a fourth spring supported at a force-transmitting element which is actuatable by a second electromechanical transducer and which affords a transmission of the force of said fourth spring to said first valve body in the event of a failure of said second electromechanical transducer.

13. A valve arrangement as recited in claim 1, wherein said first valve body is coupled to a said second valve body by means of said spring.

14. A valve arrangement as recited in claim 1, wherein said first valve body has the shape of a bushing which is slidingly guided on a stationary guide element, such that said bushing interacts with a plurality of cross-sectional areas of flow which are formed on said guide element.

15. A valve arrangement as recited in claim 14, wherein said cross-sectional areas of flow comprise slots.

16. A valve arrangement as recited in claim 14, wherein the second hydraulic connection comprises a first bore formed on said guide element, a cylindrical chamber which accommodates said second valve body and said first spring, and by a second bore formed on said bushing coaxially with said first bore.

17. A valve arrangement as recited in claim 16, wherein said second valve body is a ball which is prestressed by said first spring and which interacts with a sealing seat being configured at one end of said first bore.

18. A valve arrangement as recited in claim 16, wherein a compensation of hydraulic forces occurs in an effective range during the interaction between said bushing and said cross-sectional areas of flow.

19. A valve arrangement as recited in claim 18, further comprising an additional chamber positioned downstream of said cross-sectional areas of flow relative to a flow direction, wherein at least one of said bushing and said additional chamber are configured such that a minimum deviation of a volumetric flow is maintained.

20. A valve arrangement as recited in claim 19, wherein a front surface of said bushing has a truncated-cone shape, said front surface interacting with said cross-sectional areas of flow.

21. A valve arrangement as recited in claim 18, wherein said cross-sectional areas of flow end up in an annular hydraulic chamber which is connected to an outlet of the valve arrangement such that the static pressure coming about within said annular chamber causes a hydraulic force component which counteracts Bernoulli's forces acting on said bushing.

22. A valve arrangement as recited in claim 14, further comprising means for ensuring a nonlinear dependence of a cross-sectional area of opening of said cross-sectional areas of flow on the excursion of said first valve body.

23. A valve arrangement as recited in claim 22, wherein a front surface of said first valve body is provided with notches.

24. A valve arrangement as recited in claim 22, wherein said first valve body is furnished with bores interacting with said cross-sectional areas of flow.

25. A valve arrangement as recited in claim 22, wherein said cross-sectional areas of flow in said guide element are configured in the shape of bores.

26. A valve arrangement as recited in claim 14, further comprising a plurality of filter elements arranged within said valve assembly such that said filter elements precede hydraulic connections.

27. A valve arrangement as recited in claim 26, wherein one of said filter elements is positioned in said guide element before said cross-sectional areas of flow.

28. A valve arrangement as recited in claim 10, further including a guide element wherein said second hydraulic connection comprises a plurality of cross-sectional areas of flow formed in said guide element, and wherein said second valve body is designed as a bushing which is slidingly guided on said guide element and which interacts with a sealing seat being formed on said guide element.

29. A valve arrangement as recited in claim 28, wherein said sealing seat is formed by a step of relatively larger diameter adjacent a smaller diameter in said guide element.

30. A valve arrangement as recited in claim 1, wherein said first valve body is part of a travel sensor device interacting with or coupled to a controller.

31. A valve arrangement as recited in claim 1, wherein said first valve body is pilot-controlled.

* * * * *